G. P. WHITE.
SPRING FILLER OR CUT-OFF FOR USE IN CONNECTION WITH MOLDING MACHINERY.
APPLICATION FILED JUNE 8, 1911.
1,041,540. Patented Oct. 15, 1912.
3 SHEETS—SHEET 1.
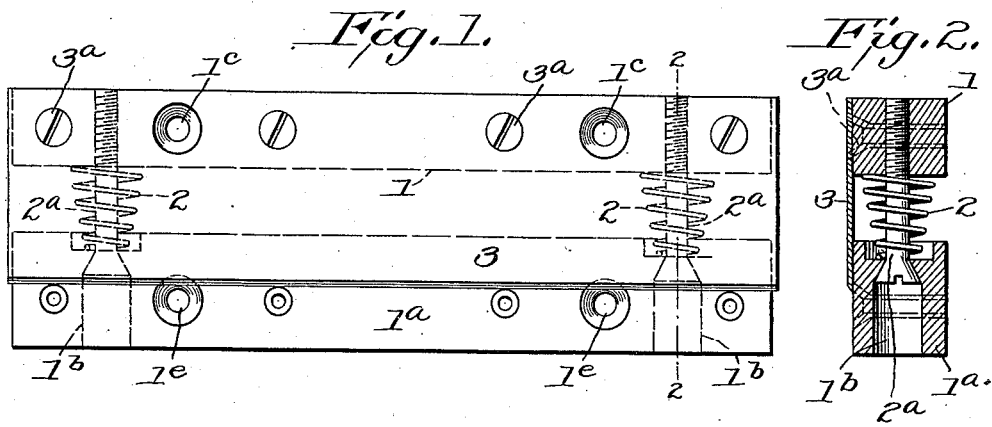
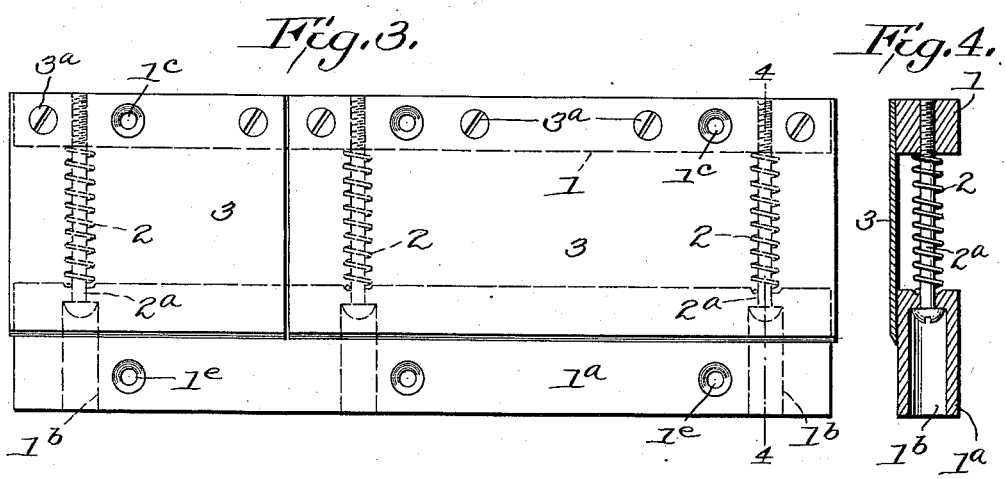
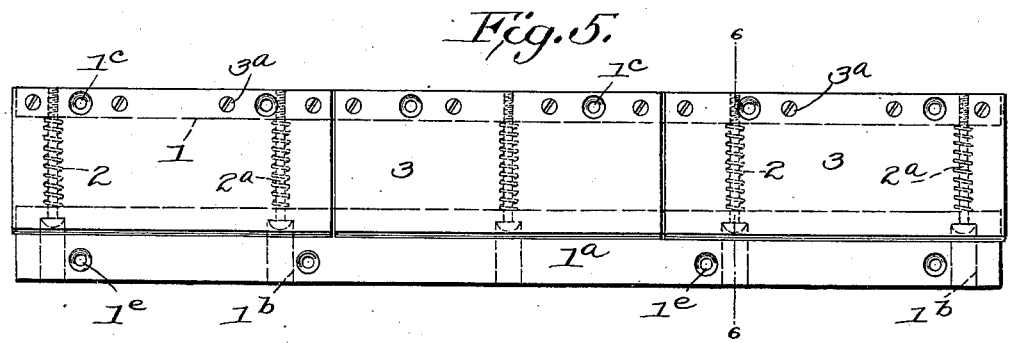
WITNESSES
INVENTOR
George P. White
By:
Alexander Powell, Attorney G. P. WHITE.
SPRING FILLER OR CUT-OFF FOR USE IN CONNECTION WITH MOLDING MACHINERY.
APPLICATION FILED JUNE 8, 1911.
1,041,540.
Patented Oct. 15, 1912.
3 SHEETS—SHEET 2.
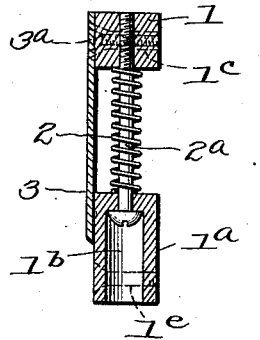
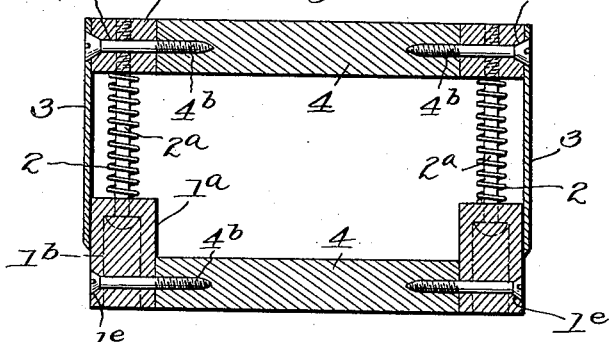
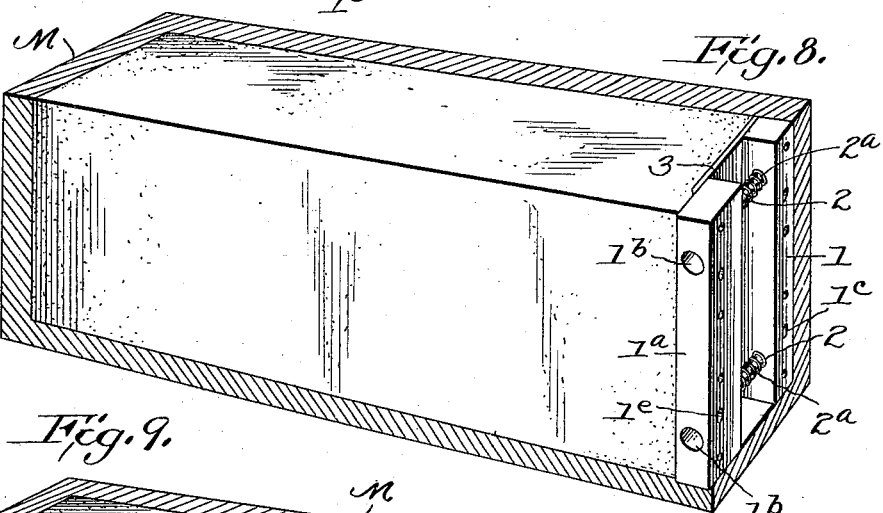
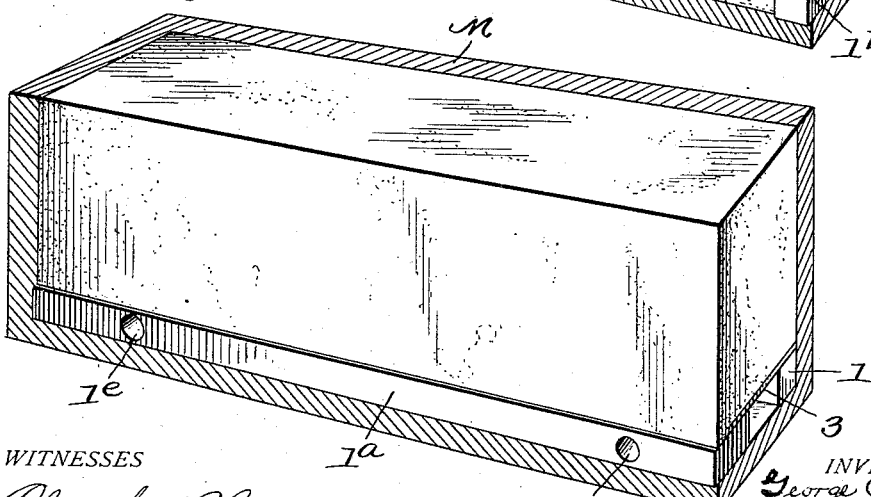
WITNESSES
INVENTOR
George P. White
By:
Attorneys G. P. WHITE.
SPRING FILLER OR CUT-OFF FOR USE IN CONNECTION WITH MOLDING MACHINERY.
APPLICATION FILED JUNE 8, 1911.
1,041,540.
Patented Oct. 15, 1912.
3 SHEETS—SHEET 3.
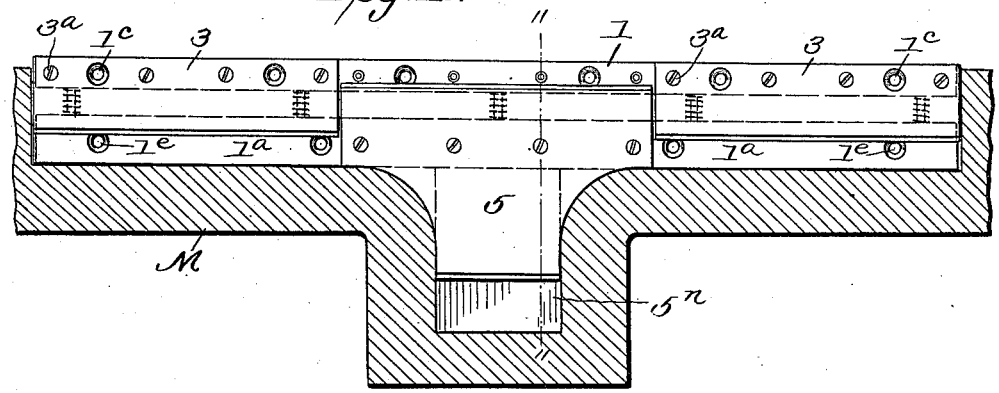
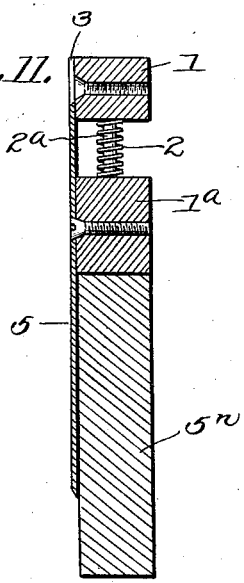
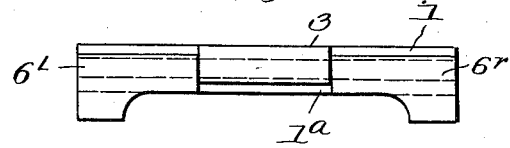
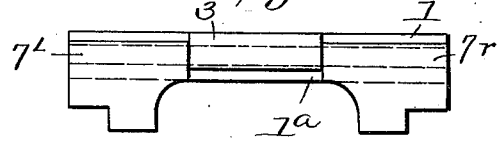
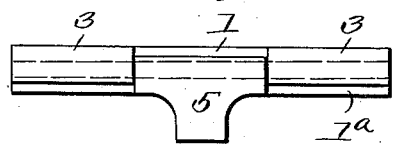
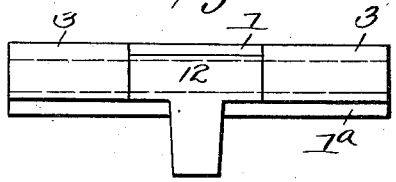
WITNESSES
INVENTOR
George P. White
By Alexander Fowell
Attorneys
COLUMBIA PLANOGRAPH CO., WASHINGTON, D. C.

UNITED STATES PATENT OFFICE.

GEORGE PATCHETT WHITE, OF WALLACE, IDAHO, ASSIGNOR TO J. A. FERGUSON, OF DENVER, COLORADO.

SPRING FILLER OR CUT-OFF FOR USE IN CONNECTION WITH MOLDING MACHINERY.

1,041,540.          Specification of Letters Patent.      Patented Oct. 15, 1912.

Application filed June 8, 1911. Serial No. 632,048.

*To all whom it may concern:*

Be it known that I, GEORGE PATCHETT WHITE, of Wallace, in the county of Shoshone and State of Idaho, have invented certain new and useful Improvements in Spring Fillers or Cut-Offs for Use in Connection with Molding Machinery; and I hereby declare that the following is a full, clear, and exact description thereof, reference being had to the accompanying drawings, which form part of this specification.

This invention relates to machinery for manufacturing artificial stone building blocks, and is particularly designed for use in the manufacture of concrete stone blocks and in connection with the adjustable molds of the type shown in patent to J. A. Ferguson No. 772,032 of October 11th, 1904, and in connection with the machines shown in G. P. White's Patent No. 821,270 of May 22nd, 1906. Such machines are provided with molds adapted to form a certain maximum size and style of block, and such molds are provided with detachable attachments which may be used in connection therewith to produce different sizes and shapes of blocks.

The object of the present invention is to provide compressible "fillers," or spring "cut-offs" which can be used in connection with such molds to produce blocks shorter than the regular length blocks, and narrower than the regular width blocks. Such spring fillers are designed to be placed in the mold before the material is placed therein, and are so designed that they will come even with the top or mouth of the mold box on top,—when used for shortening or narrowing different lengths of block, and will give or yield as required by the action of the plunger by which the material is compressed in the mold.

Each spring filler in practice consists essentially of two steel bars between which are interposed sets of springs that normally hold the filler expanded, the expansion of the filler being limited by means of screw bolts; and the space between the two bars, on the side next to the material in the mold, is covered by a galvanized metal plate, preferably attached to one of the bars and having a sliding contact with the surface of the adjacent bar, so that material in the mold cannot get between the bars and interfere with the proper operation of the filler.

In the accompanying drawings I have illustrated several forms of these fillers constructed in accordance with the invention, and will explain same with reference thereto; for the general construction of the mold, and mode of using same, I refer to the aforesaid Ferguson Patent No. 772,032, and for the operation of the machine in making blocks with such molds I refer to the aforesaid White Patent No. 821,270.

In the drawings—Figure 1 is a face view of one of the spring fillers, or cut-offs. Fig. 2 is a section of such spring filler on line 2—2, Fig. 1. Fig. 3 is a front view of a similar spring-filler or cut-off for a different shape block. Fig. 4 is a section on line 4—4, Fig. 3. Fig. 5 is a view of another form of such spring-filler. Fig. 6 is an enlarged section on line 6—6, of Fig. 5. Fig. 7 is a transverse section showing how two such spring-fillers or cut-offs may be connected so as to fill a wider space. Fig. 8 is a view showing how the spring-fillers may be used in making blocks shorter than the regular length blocks. Fig. 9 is a view showing how the spring-fillers may be used in making blocks narrower than the regular width blocks. Fig. 10 is a view of a spring filler adapted for irregular shaped molds. Fig. 11 is an enlarged section on line 11—11, of Fig. 10. Figs. 12, 13, 14 and 15 are detail views of different forms of spring fillers that may be used in connection with irregular molds.

As shown in the drawings each spring-filler, or cut-off, is composed essentially of two opposite parallel bars 1, 1ª, which are preferably of steel and are forcibly separated by means of helical springs 2 interposed between the bars and strung upon screws 2ª, preferably passed through sockets 1ᵇ in bar 1ª and tapped into suitably threaded holes in bar 1.

Attached to the outer face of bar 1 is a plate 3 of sheet metal, preferably galvanized, and which may be secured to the bar by flush headed screws 3ª. This plate spans the space between the bars and lies closely against the outer surface of the bar 1ª.

It will be seen that such filler, or cut-off, can be compressed by forcing the bars 1, 1ª, toward each other but the space between the bars will always be bridged by the plate 3. Preferably the bars 1, 1ª, are provided with transverse openings 1ᵉ, 1ᶜ, to enable wooden expanders to be connected thereto, for a purpose hereinafter explained.

Preferably these fillers are made but one inch in width; but their length and height may be varied according to the size of mold with which they are to be used, and size of block to be made.

The number of screws or bolts 2ª used in the spring cut-offs will depend upon their length, two being shown in Fig. 1; three in Fig. 3; and five in Fig. 5.

The plate 3 may be provided with countersunk openings registering with openings 1ᶜ. The plate 3 may be made continuous for certain lengths of fillers, or may be made in sections, as indicated in Figs. 3 and 5.

The spring-filler shown in Fig. 1 is particularly designed for use in making blocks shorter than the regular length of block; i. e. shorter than the original mold is designed to make; and they are to be placed vertically in the end of the mold as indicated in Fig. 8. If the block is to be made more than one inch shorter than the regular length of block for which the mold is designed, two spring-fillers may be placed in the mold side by side.

If it is desired to make blocks more than two inches shorter than the regular mold size, instead of using an increased number of the fillers I prefer to use two of the fillers and connect them by means of expanders or filler-plates 4, see Fig. 7, which are interposed between the opposed bars 1, and 1ª, of two similar fillers these expanders 4 being secured to the filler blocks by means of screws 4ᵇ inserted through the holes 1ᶜ, 1ᵉ. These expander or filler plates 4 can readily be made of wood, and of any desired length and width,—for instance if it is desired to shorten the regular mold block five inches the wooden expanders can be made three inches wide, and when inserted between and connected to two adjacent spring fillers as described the total width of the cut off will be five inches, see Fig. 7. Of course by using proper sized expanders 4 the regular mold blocks can be shortened to any desired extent.

The spring fillers shown in Figs. 3 and 5 are particularly designed for use in making blocks narrower than the regular size of blocks for which the mold is designed. The regular sized blocks are ordinarily made nine inches in width. If it should be desired to make blocks only eight inches in width, for example, then a spring filler is placed in the mold as shown in Fig. 9, so as to narrow the interior of the mold one inch, therefore the resultant block will be but eight inches wide. If it is desired to make blocks only seven inches wide two such spring fillers may be used. If it is desired to make blocks six inches or less in width, two of such spring fillers may be spaced apart and connected by expanders 4 in the manner above described to form a spring filler of the desired thickness, see Fig. 7.

The spring fillers used in narrowing the width of blocks in forming a mold preferably have the plates 3 made in sections as indicated in Figs. 3 and 5, and this is to enable any section of such plate to be removed and substituted, if desired, by irregular shaped plates such as are indicated in Figs. 10 to 15 of the drawings. This is to enable blocks of irregular shape, such as T-blocks or U-blocks which can be made in a properly shaped mold M (indicated in Figs. 8, 9, 10) to be narrowed in width without having to make a special spring cut-off for each form of such block. For this reason the plates 3 on spring fillers to be used lengthwise of the mold are so divided that certain sections thereof can be removed and replaced by sections shaped to suit the various forms of blocks used in T-wall construction. For example the middle section of the plate shown in Fig. 5 may be removed and a T-shaped plate 5 (Fig. 10) substituted therefor. In this case the plate 5 is preferably screwed onto the lower bar 1ª and extends across the space and rests upon the bar 1 to which the other sections 3 are secured. The shank of the plate-section 5 projects beyond the bar 1ª and is adapted to fill the irregular or shank recess in the mold in which such spring filler is employed, the mold being indicated at M in the drawings. In this way it will be observed that the spring filler can be compressed although it is irregular in shape because bars 1, 1ª can move relatively without displacing plate 5; the bar 1 being that which is pressed toward bar 1ª and plate 5, and bar 1ª practically remaining stationary, the sections 3 attached to bar 1 slide upon bar 1ª and the forward edge of section 5 slides upon bar 1. These specially shaped sections are not designed to extend to full depth of lugs and no backing is supplied below the shell of block. This space is intended to be filled with wood block indicated at 5ⁿ in Figs. 10 and 11, preferably corresponding in shape to the irregularity and as thick as amount of original block to be cut off, measuring from the shell less ¼ inch for play. For instance, the wood block to use for cutting a 12 inch wall regular main wall block to six inch wide face would be 1–16 (thickness of sheet iron) less than 3 inches (to get 6 inch wide face). The total length of lug for 12 inch wall is 8 inches from face. The shell used is 3½ inches, leaving 4½ and ¼ off for play leaves 4¼ for thickness of wood block. This block is dropped into the mold first and the spring filler afterward. When pressure is applied, wood block is pressed up toward and to within ¼ inch of bottom of spring cut-off, all dropping out with block and being replaced before mold is filled.

As shown in Fig. 13 the two end sections 3 are removed and substituted by irregularly shaped sections 6¹ and 6ʳ which latter sections are attached to the bar 1ᵃ but operated in the manner described above for section 5, and are intended to be used in a correspondingly shaped mold.

As shown in Fig. 14 the spring filler is provided with irregularly shaped end sections 7¹ and 7ʳ, which sections 7¹ and 7ʳ are preferably attached to the bar 1ᵃ and this spring-filler can be used in a correspondingly, irregularly, shaped mold.

As shown in Fig. 15 the central section is replaced by a T-shaped section 12 which is attached to the bar 1ᵃ in place of, but similar to, the section 5 in Fig. 10.

Of course, these irregularly shaped sections for the spring-fillers are simply illustrative, and not definitive of the invention, and any one familiar therewith will readily understand how the spring-fillers can be thus adapted for use in any irregularly shaped mold.

Having described my invention I claim:—

1. In combination a pair of spring fillers each comprising opposite bars, means normally separating these bars to expand the fillers, and means for limiting the expansion of the fillers; with expanders interposed between the similar bars of the adjacent fillers and connected therewith.

2. In combination with a pair of spring fillers each comprising opposite bars, means normally separating these bars to expand the filler, means for limiting the expansion of the filler, and a plate attached to one bar and bridging the space between the bars; with expanders interposed between the similar bars of the adjacent fillers and detachably connected therewith.

3. A spring filler for irregularly shaped molds comprising a pair of bars, springs interposed between the bars for separating them, means connected to one bar and slidably engaging the other for limiting the expansion of said bars, plate sections bridging the space between the bars, certain sections being attached to one bar and slidably contacting the opposite bar, and other irregular shaped sections being attached to the latter bar and projecting across the space between the bars and slidably contacting the opposite bar, said irregular sections also projecting beyond the outer edge of the bar to which they are attached, so as to fit an irregular part of the mold, substantially as described.

In testimony that I claim the foregoing as my own, I affix my signature in presence of two witnesses.

GEORGE PATCHETT WHITE.

Witnesses:
J. M. MAXWELL,
JAY WILDER.

---

Copies of this patent may be obtained for five cents each, by addressing the "Commissioner of Patents, Washington, D. C."